United States Patent
Grooters et al.

(10) Patent No.: US 7,260,610 B2
(45) Date of Patent: Aug. 21, 2007

(54) CONVERGENCE EVENTS NOTIFICATION SYSTEM

(75) Inventors: Brandon A. Grooters, Bedford, TX (US); Mark A. Colbath, Bedford, TX (US)

(73) Assignee: Gateway Inc., Irvine, CA (US)

( * ) Notice: Subject to any disclaimer, the term of this patent is extended or adjusted under 35 U.S.C. 154(b) by 626 days.

(21) Appl. No.: 10/715,289

(22) Filed: Nov. 17, 2003

(65) Prior Publication Data

US 2004/0103167 A1 May 27, 2004

Related U.S. Application Data (63) Continuation of application No. 09/021,568, filed on Feb. 10, 1998, now abandoned.

(51) Int. Cl.
*G06F 15/16* (2006.01)
*G06F 15/173* (2006.01)

(52) U.S. Cl. .................... 709/207; 709/224
(58) Field of Classification Search ............... 709/200, 709/206, 207, 223, 224; 710/1; 714/5, 6
See application file for complete search history.

(56) References Cited

U.S. PATENT DOCUMENTS

| | | | |
|---|---|---|---|
| 4,774,658 A | 9/1988 | Lewin | 364/200 |
| 5,231,633 A | 7/1993 | Hluckyj et al. | 370/94.1 |
| 5,416,725 A | 5/1995 | Pacheco et al. | 364/514 |
| 5,499,196 A | 3/1996 | Pacheco | 364/552 |
| 5,699,502 A | 12/1997 | Swanberg et al. | 395/182.22 |
| 5,721,825 A | 2/1998 | Lawson et al. | 395/200.33 |
| 5,768,614 A | 6/1998 | Takagi et al. | 395/821 |
| 5,828,882 A | 10/1998 | Hinckley | 395/680 |
| 5,942,986 A | 8/1999 | Shabot et al. | 340/825.44 |
| 5,961,651 A | 10/1999 | Gittins et al. | 714/5 |

*Primary Examiner*—Paul H. Kang
(74) *Attorney, Agent, or Firm*—Ross F. Hunt, Jr.; Stites & Harbison PLLC (57) ABSTRACT

A method and apparatus for furnishing a user with notification of events occurring within an computer-based information handling system, convergence system, or the like is disclosed. Multiple software applications executing within the system are monitored for the occurrence of selected events, whereupon a notification of the event may be generated and displayed to the user via a single integrated user interface. The user may take action on the event by selecting the displayed notification whereupon the system communicates the desired action to the application for execution.

30 Claims, 6 Drawing Sheets

CONVERGENCE EVENTS NOTIFICATION SYSTEM

CROSS REFERENCE TO RELATED APPLICATIONS

This is a continuation of Ser. No. 09/021,568, entitled "Convergence Events Notification System," filed Feb. 10, 1998 now abandoned.

BACKGROUND OF THE INVENTION

The present invention relates generally to computer-based information handling systems, and more specifically to a method for providing the user of a computer-based information handling system, convergence system, or the like with notification of events occurring in multiple applications and processes executing within the system.

Convergence systems typically comprise multimedia personal computers providing hardware and software capable of integrating various information and entertainment media into a single user friendly platform. A convergence system may, for example, provide a user with access to media such as telephony, television, digital communications (Internet and e-mail), and interactive entertainment or gaming. To access these media, the convergence system must often utilize existing third party software applications and processes which are capable of generating a variety of messages or events to provide information to and request action from the user. However, because these applications may not have originally been intended to be integrated with each other, the events they generate may be presented to the user in a variety of formats which may at times become confusing. Further, if the convergence system is executing multiple applications or processes simultaneously, event notifications generated by one application may interfere with the execution of other applications.

Known to the art are message notification systems which, for example, inform a user when electronic mail is received by a computer system. Such message notification systems typically display a notification which comprises, for example, an icon informing the user that an event has occurred in the application. However, present message notification systems only provide the user with notification of events occurring in a single application. They are incapable of providing notifications of events occurring in multiple third party applications and processes. Accordingly, it would be advantageous to provide a method of notifying the user of a computer-based information handling system, a convergence system, or the like of events occurring or scheduled to occur in multiple software applications and processes via a single integrated graphical user interface.

SUMMARY OF THE INVENTION

Therefore, a primary object of the present invention is to provide a method of notifying the user of a computer-based information handling system, convergence system, or the like of events occurring or scheduled to occur in multiple software applications and processes via a single integrated user interface.

The present invention provides a novel method and apparatus for furnishing the user of a computer-based information handling system, convergence system, or the like with notification of events occurring in multiple software applications and processes. According to the present invention, one or more software applications or processes may be monitored for the occurrence or scheduled occurrence of selected events. When a selected event is detected, a notification representing the event is generated and displayed to the user via a single integrated user interface. The user may take action on the event by selecting the displayed notification whereupon the system communicates the desired action to the application for execution. In this manner, multiple events occurring within the system may be detected and displayed on a single integrated user interface.

It is to be understood that both the foregoing general description and the following detailed description are exemplary and explanatory only and are not restrictive of the invention claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
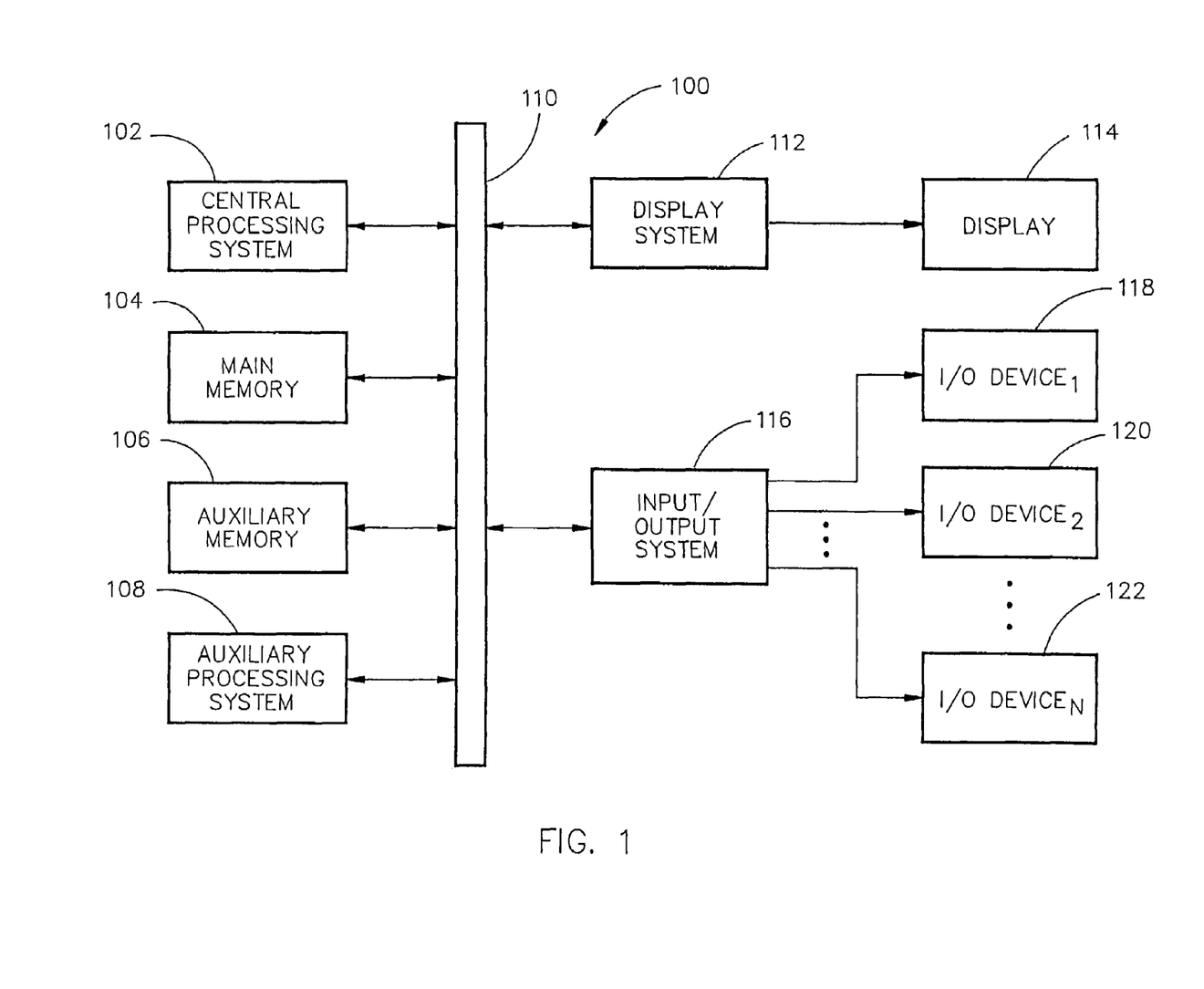
FIG. 1 is a block diagram depicting a typical hardware environment of a computer-based information handling system.

Referring now to FIG. 1, a hardware system in accordance with the present invention is shown. The hardware system shown in FIG. 1 is generally representative of the hardware architecture of a computer-based information handling system of the present invention. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, auxiliary memory 106, and an auxiliary processing system 108 as required. The main memory 104 provides storage of instructions and data for programs executing on the central processing system 102. The main memory 104 is typically semiconductor based memory such as dynamic random access memory (DRAM) and or static random access memory (SRAM). The auxiliary memory 106 provides storage of instructions and data that are loaded into the main memory 104 before execution. The auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 100 further includes a display system 112 for connecting to a display device 114, and an input/output (I/O) system 116 for connecting to one or more I/O devices 118, 120 up to N number of I/O devices 122. The display system 112 may comprise a video display adapter having all of the components for driving the display device, including video random access memory (VRAM), buffer, and graphics engine as desired. The display device 114 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 116 may comprise one or more controllers or adapters for providing interface functions between the one or more I/O devices 118-122. For example, the input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 116 and I/O devices 118-122 may provide or receive analog or digital signals for communication between the hardware system 100 of the present invention and external devices, networks, or information sources.

The input/output system 116 and I/O devices 118-122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
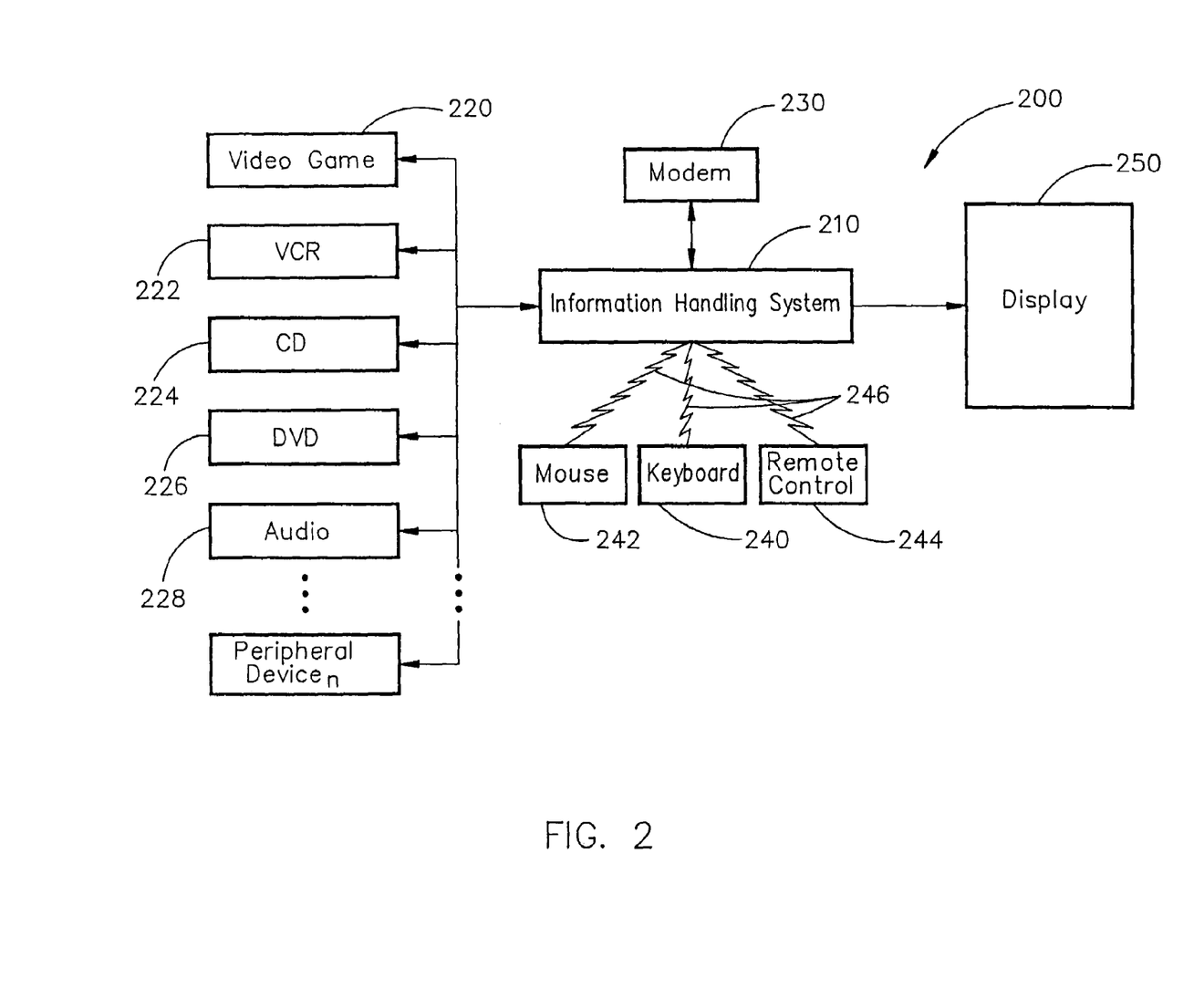
FIG. 2 is a block diagram depicting a typical convergence system utilizing a computer-based information handling system such as that shown in FIG. 1.

Turning now to FIG. 2, a block diagram depicting a typical convergence system is shown. The convergence system 200 preferably comprises a computer-based information handling system 210, such as the computer-based information handling system described in connection with FIG. 1, which is adapted to integrate multiple information and entertainment media such as, for example, television, telephony, Internet, e-mail, and interactive gaming into a single platform. The information handling system 210 may function as a central control device to control peripheral components of the convergence system such as an interactive entertainment (video gaming) apparatus 220, a video cassette recorder (VCR) 222, compact disk or video laser disk players 224, a digital versatile disk (DVD) or readable/writeable digital versatile disk (DVD+RW) device 226, or audio equipment 228 such as an audio processor, audio amplifier, surround sound or AC-3 type processor.

The information handling system 210 may comprise one or more computer peripheral type devices such as a CD-ROM drive, floppy disk drive, scanner, video or audio input devices (e.g. camera or camcorder), or large capacity storage media, for example. The information handling system 210 may be connected to the Internet via a modem or codec 130 for connections to the Internet, for file transfer protocol, Telnet, gopher, Usenet, or e-mail connections. The external connections may be implemented according to any one of various available communications protocols such as public telephone network (PTN), public switched telephone network (PSTN), subrate digital loop (SRDL), digital subscriber line (DSL), asymmetric digital subscriber line (ASDL), frame relay, asynchronous transfer mode (ATM), Ethernet, Fibre Channel, integrated services digital network (ISDN), cable modem, cellular, personal communications services (PCS), radio-frequency (RF), twin lead or coaxial cable, transmission control protocol/Internet protocol (TCP/IP), serial line, Internet protocol/point to point protocol (SLIP/PPP), local area network (LAN) or wide area network (WAN) type communications, or the like.

A user of the convergence system 200 may control the various components of the system via one or more user control devices which operatively communicate with the information handling system 210. These user control devices may include, for example, a keyboard 240, a pointing device such as a mouse 242, and a remote control unit 244. Preferably, the user control devices are operatively coupled to the information handling system via a wireless infrared communication link 246. Video information may be displayed on a display 250 which is preferably a large screen high resolution, e.g. video graphics array (VGA), super video graphics array (SVGA) or the like, cathode ray tube (CRT) monitor. Alternatively, the display may comprise a projection device or a flat screen liquid crystal display such as an active matrix, supertwisted nematic display or plasma based display, for example.

The information handling system 210 may utilize a variety of independent software applications and processes. Each of these applications or processes may be capable of generating multiple events to provide information to or request action from the user. The present invention provides a method of furnishing notification of events occurring in multiple applications and processes to the user via a single integrated user interface (UI), whereupon the user may take action on selected ones of the events.

Figure 3:
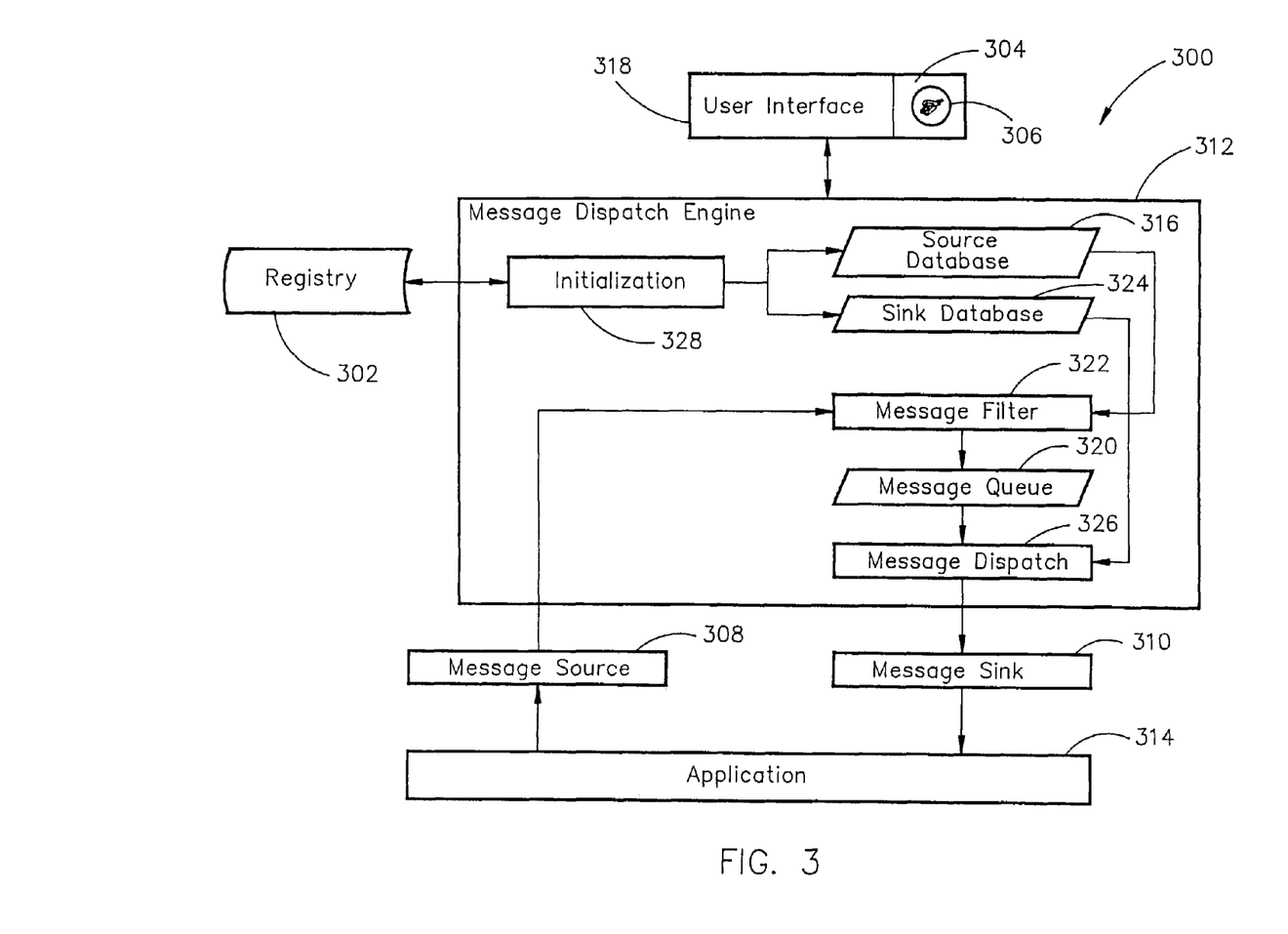
FIG. 3 is a block diagram illustrating the basic architecture of the convergence events notification system wherein the function of the primary modules associated with the system are shown and wherein shared memory files are utilized to transfer messages between modules.

Turning now to FIG. 3, the convergence events notification system 300 preferably utilizes a simple, robust, and resource friendly system level process to notify the user of, and allow the user to take action on, various events which occur in an information handling system, convergence system, or the like. These events may occur in multiple processes and applications and at many different levels. The system 300 marshals messages and data from multiple applications, presents the messages to the user in a user friendly on-screen presentation, allows the user to take action on the message, and communicates that action to the application for execution. Additionally, the system may be utilized to inform the user of hardware events. For example, the system may generate a notification to inform the user that the hard disk is low on free space. Upon receiving this notification, and deciding that action should be taken, the user may select the notification to start a disc compression application. Preferably, the notification system 300 is capable of functioning for extended lengths of time with minimal system resource consumption. This consumption includes, but is not limited to: central processing unit (CPU) cycles, shared system memory, graphical device interface (GDI) resources, and system Kernel resources such as memory handles, timers, and the like.

According to the exemplary embodiment described herein, a user may create and store in memory, for example in a registry file 302, a list of events of which he or she wishes to be notified by the system. Preferably, the user interface 304 may comprise an event selection screen which allows the user to select desired events from a list of all events capable of being monitored by the system 300. The user may also prioritize the selected events according to their importance. For example, a user may not wish a television program he or she is watching to be interrupted with a notification indicating that e-mail has been received. Instead, the user may desire that the system save this notification and display it at a later time. Thus, the user may assign an e-mail application notification a lower priority than a television application notification. If a user does not wish to select and prioritize events, a default list of events may be provided by the system along with their corresponding priority. The convergence events notification system 300 may then monitor the appropriate software applications within the convergence system for occurrence of the selected events. When the occurrence of an event is detected, the system may display a notification of the event via a single integrated user interface 304. Preferably, each notification displayed in the user interface comprises an animated icon 306 which resembles the event it represents. For example, the system may display an icon depicting a telephone ringing to represent an incoming telephone call.

The convergence notification system 300 preferably includes three distinct types of modules or processes: message sources 308, message sinks 310, and a message dispatch engine 312. Messages, which comprise shared memory mapped files containing data related to an event, may be utilized to pass data between each of these modules. Thus, a message may pass data from the event sources 308 to the event dispatch engine 312 and from the event dispatch engine 312 to the event sinks 310. Preferably, messages may be generated for events occurring in multiple third party applications. For example, an e-mail application may cause a message to be generated upon the occurrence of an event, the receipt of e-mail, or a message may be generated to inform a user that a desired television program is being aired even though these events occur in independent third party software applications.

Message sources 308 preferably comprise dynamic-link library (DLL) files which monitor desired applications 314 for the occurrence of events. When a message source 308 detects an event, it routes a message to the message dispatch engine 312. Preferably, the structure of each message source 308 depends on the application or process 314 generating the event. For example, for certain applications, such as those generating messaging application programming interface (MAPI) or telephony application programming interface (TAPI) compliant messages, application programming interfaces (API) may be used to monitor the applications for events, while in other applications API's can not be used. FIG. 2 illustrates a single application 314 and a single message source 308. However, one skilled in the art will recognize that there may be several message sources present in the system at any given time.

Upon receipt of a message, the message dispatch engine 312 may generate a notification which comprises an on-screen representation of the message. Preferably, this notification is displayed via a single integrated user interface 304. All user activity with respect to the notification, such as displaying the notification banner 318, or activating the message by selecting the notification icon 306, are controlled by the message dispatch engine 312. Internally, the message dispatch engine 312 maintains an event queue 220 of all current messages. The data structure for the event queue 320 is preferably capable of maintaining information about the message such as: message category, message sub-category, priority of the message, time of initiation of the message, and the like. Message filters 322 may provide a means for the user to act on incoming messages. The message filters 322 may or may not have an internal event queue, and may or may not have a distinct user interface.

Preferably, all message activation by the user takes place via the single integrated user interface 304. A user may activate a message by clicking the mouse cursor in the icon or banner areas 306 & 318 of the notification. If the user activates a message, the message may be dispatched to the appropriate message sink 310 by the event dispatch engine 312. The message is then permanently removed from the internal event queue 320. The message dispatch engine 312 maintains internal databases of registered message sources 316 and message sinks 324. These databases are used by the message dispatch engine 312 to determine what categories of messages are generated by a particular message source 308, and to determine which message sinks 310 to send a message to once it has been activated by the user. If the user does activate a message by clicking the mouse cursor in the icon or banner areas 306 & 318 within a predetermined amount of time, the notification may be removed from the user interface 304 by the message dispatch engine 312.

The message sinks 310 may receive activated messages which the user has selected through the user interface 304. Preferably, each event sink 310 takes a specific action once an activated message is received. The action taken may be dependent on the type of message originally generated by the application 314. Several event sinks 310 may exist within the system at any given time. Preferably, each event sink is registered with the message dispatch engine to receive a specific category of messages from the event dispatch engine 312. Further, there may be more than one message sink 310 registered to receive a single message category. In this case, the event dispatch engine 312 may post the message to all registered event sinks 310.

Each module or component of the convergence event notification system 300 preferably utilizes standard Win32 API and architecture. The event dispatch engine event queue 320 is preferably constructed as a component object model (COM) data object. This construction allows for easy, robust transfer of notification data from process to process. By implementing advisory connections on this data object, the event dispatch engine 312 may be immediately notified internally when an event source 308 generates a message.

Figure 4:
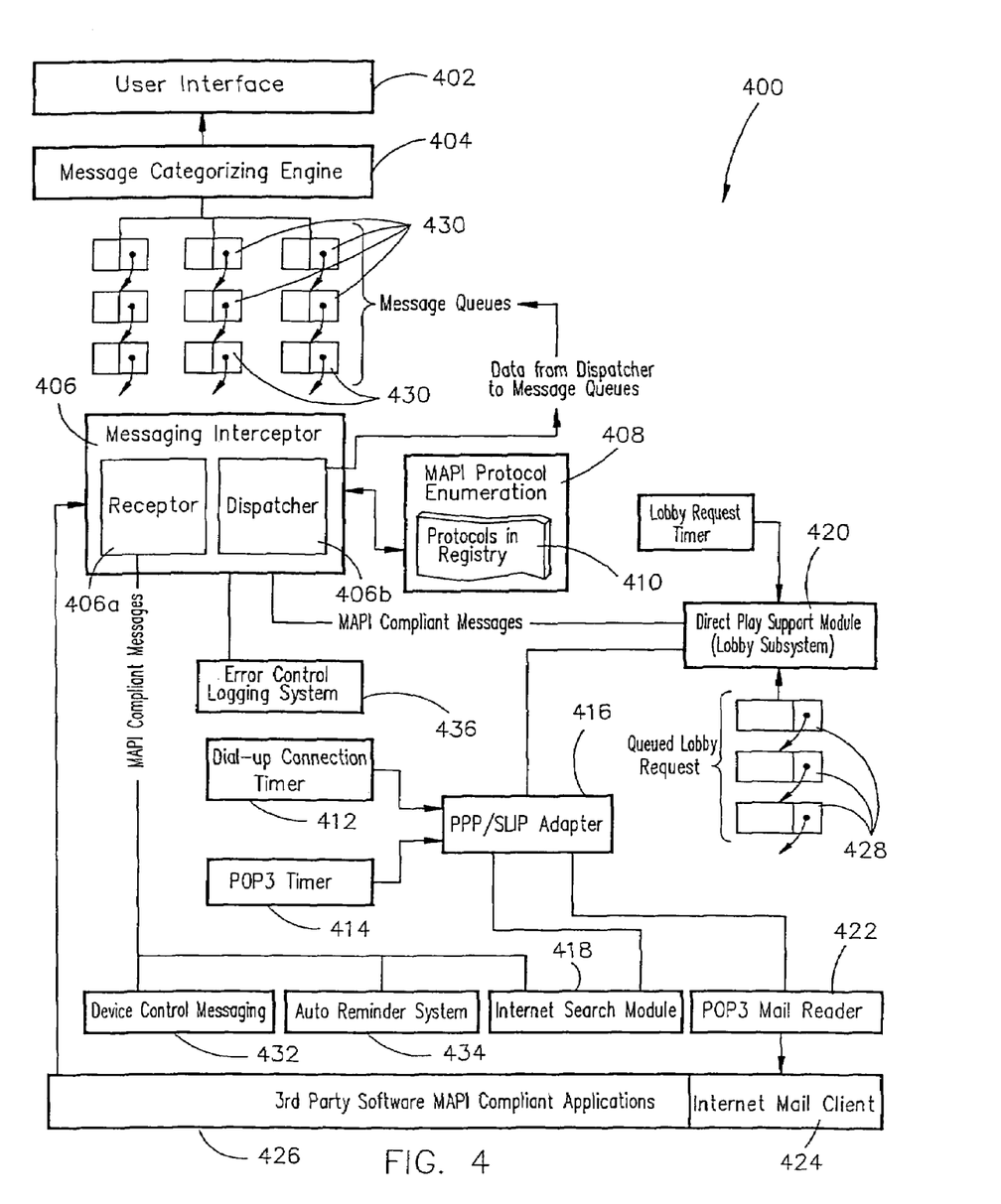
FIG. 4 is a block diagram illustrating the implementation of an exemplary embodiment of the events notification system.

Turning now to FIG. 4, a block diagram illustrating the implementation of an exemplary embodiment of a convergence events notification system is shown. According to this embodiment, the convergence events notification system 400 may comprise a user interface 402 which may include a means for displaying notifications indicating the status of queued events. A message categorizing engine 404 preferably accepts messages in a MAPI compliant format and queues each message to the user interface 402 so that the user interface 402 may display a message notification. The message categorizing engine 404 preferably categorizes messages as they are received from the messaging interceptor module 406 and ranks the messages on their current priority. For example, each message may be categorized as, for example, e-mail, information or Internet search engine, telephony, television, or the like and be given a priority of 1, 2, or 3 with 1 being the highest priority. Preferably, the message categorizing engine 404 may maintain independent message queues 430 for each category of message. In an exemplary embodiment, the message categorizing engine 404 may be capable of detecting when the convergence system display 150 (see FIG. 1) is turned off or in a power-save mode. It may then delay displaying a notification of a message so that the notification is not wasted on a blank screen.

The messaging interceptor module 406 may comprise a receptor 406a and a dispatcher 406b. Preferably, the receptor intercepts all MAPI compliant messages from a third party software application 426 executing within the system and determines the source of the message and the client application which normally displays the content of the message. The dispatcher may then dispatch this information to the message categorizing engine 404. Since each MAPI client stores its protocol in the registry 410, a MAPI protocol enumeration module 408 may be provided to enumerate these entries and establish the proper parameters for intercepting MAPI messages. Preferably, this module also manages the retrieval and processing of MAPI client protocols stored in the registry 410. Once the registry entries are processed, they may be stored in an internal format and made available to the messaging interceptor module 406. The MAPI protocol enumeration module 408 preferably accesses the registry 410, enumerates the proper keys, and makes the results available to the messaging interceptor module 406 in an object format.

The system may comprise two timers or threads and the necessary support code to provide function calls corresponding to the thread events. A dial-up connection timer or thread 412 preferably sleeps for a given period of time before attempting to establish a SLIP/PPP session to allow for the periodic checking of e-mail, establishing connections prior to certain events, or the like. This timer also manages asymmetrical timed events, such as, for example, events based on the previous days usage patterns, to establish a connection at a given time. A post office protocol 3 (POP3) timer or thread 414 may wake up every n minutes to command a POP3 mail reader client 422 to read the e-mail off of the Internet mail server 424. Preferably, this thread is not only active when a SLIP/PPP connection has been established, but may also force a dial-up connection to be established, thereby altering usage parameters for the next time period.

Because the dial-up adapter displays a dial-up connector dialog box prior to establishing a PPP/SLIP connection, a PPP/SLIP adapter module 316 may be provided. The PPP/SLIP adapter module 416 may prevent the dial-up adapter from interfering with the current user activity while a connection is being established. It preferably accommodates PPP/SLIP protocols and may be capable of establishing PPP/SLIP connections without user interaction, establishing log files of activity for error control, and establishing cutoffs for inactivity to shut down connection and provide MAPI compliant messaging. The PPP/SLIP adapter module 316 may fit into both the present system and device control architectures.

An Internet search module 418 may locate Internet information relating to the users current activity. This module may comprise a combination of meta-search engines and smart agents and is preferably capable of simultaneously logging on to multiple Internet search sights, sorting and prioritizing results, and storing data in a format which does not rely on a particular applications user interface.

A device control messaging module 432 may intercept device control messages so that these messages may be displayed by the user interface 402 to inform the user of hardware events. For example, the device control messaging module 432 may intercept a message indicating, for example, the computer's hard disk drive is low on free memory space. The system may then generate and display a notification to inform the user. Upon receiving this notification, and deciding that action should be taken, the user may select the notification to start a disc compression application.

An auto reminder system 434, such as an EPG knowledge system or the like, may provide messages indicating the occurrence of a scheduled event. Preferably, the Internet search module 418, device control messaging module 432, and auto reminder system 434, may provide MAPI compliant messages to the receptor 406a of the messaging interceptor 406.

A direct play system 420 may allow users to take advantage of direct play compatible games which use lobbying to present multi-player gaming opportunities. This module preferably allows multiple client lobby requests 428 to be queued and processes incoming notifications to the proper game.

A POP3 mail reader module 422 may respond to POP3 thread 414 events by querying the Internet mail server for any waiting mail in the client mailbox. Should any mail be present it may download that mail to the Internet mail client (e.g., Microsoft® Exchange or Internet Mail) mailbox 424. Either this module or the mail client may notify, through MAPI, that mail has been received. Preferably, the POP3 mail reader responds to POP3 thread 414 events and connects to the Internet mail server without user intervention or user interface notification to download any waiting POP3 mail and transfer that mail to the local mail client.

An error control system module 436 may log all errors and communications problems which occur during the course of processing messages. This module preferably traps errors which occur so that they are not displayed over any currently executing application. Preferably, a user may select to display the error messages on the user interface if desired.

Figure 5:
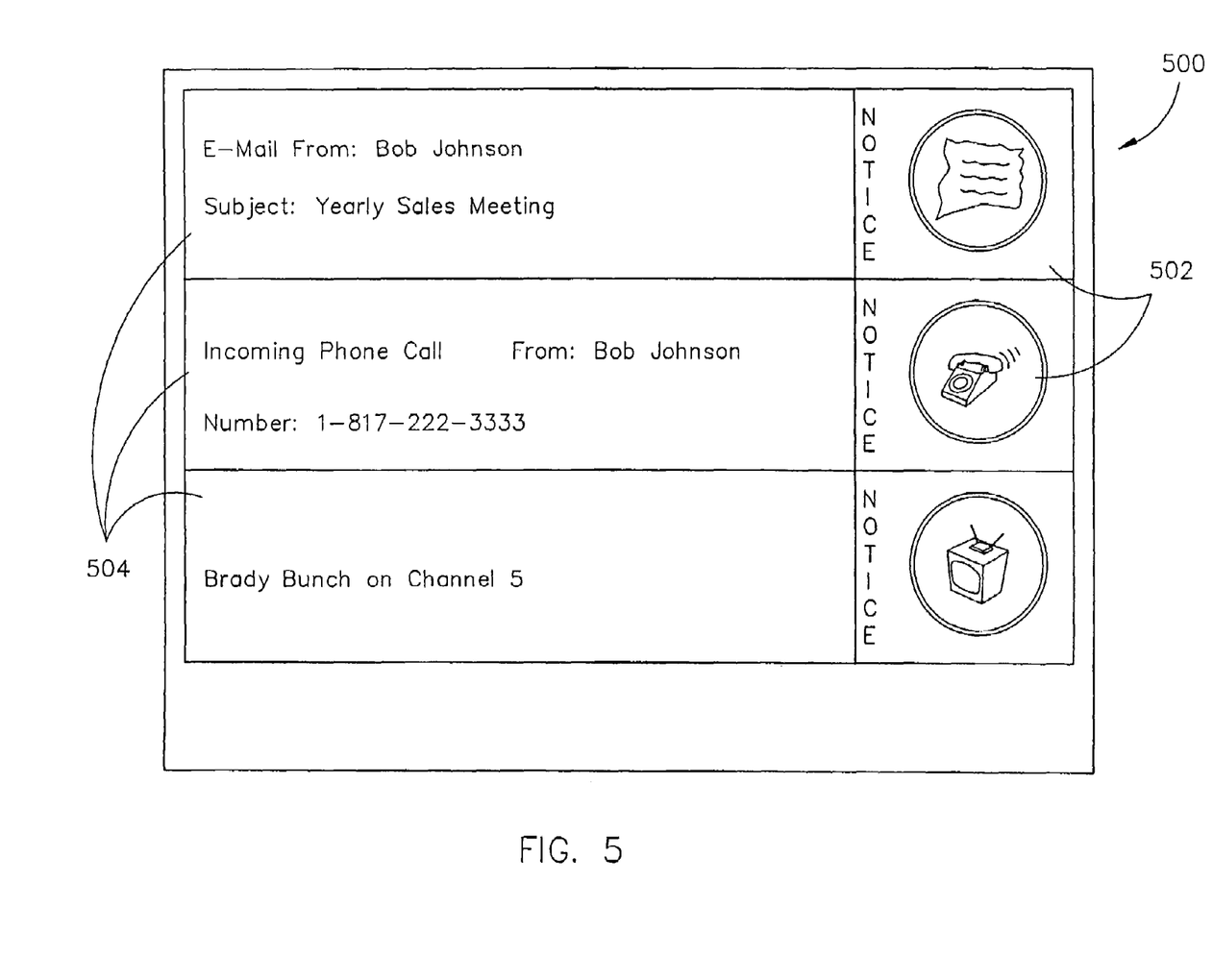
FIG. 5 depicts an exemplary single integrated user interface for providing event notifications to the user.

Referring now to FIG. 5, a single integrated user interface (UI) 500 for providing event notifications to the user is shown. The user interface 500 may display notification representing one or more events occurring in the system. Preferably, each notification displayed via the user interface comprises an icon area 502 and a banner area 504. The icon area 502 may be initially displayed to the user when a message is processed by the system and a notification is generated. Preferably, the icon area 502 contains a representation of the underlying message. For example, an icon depicting a telephone ringing may be used to notify a user of an incoming telephone call. When the user moves the mouse cursor (see FIG. 5) into the icon area 502, a banner area 504 may be displayed to the left of the icon area 502. The banner area 504 may provide the user with additional information about the event. For example, a banner may display the sender name, return e-mail address, and subject of a received e-mail message. Preferably, a notification is only displayed for a predetermined time period or until the user selects the notification. In this manner, the system may prevent the accumulation of notifications for which the user has no interest.

Figure 6:
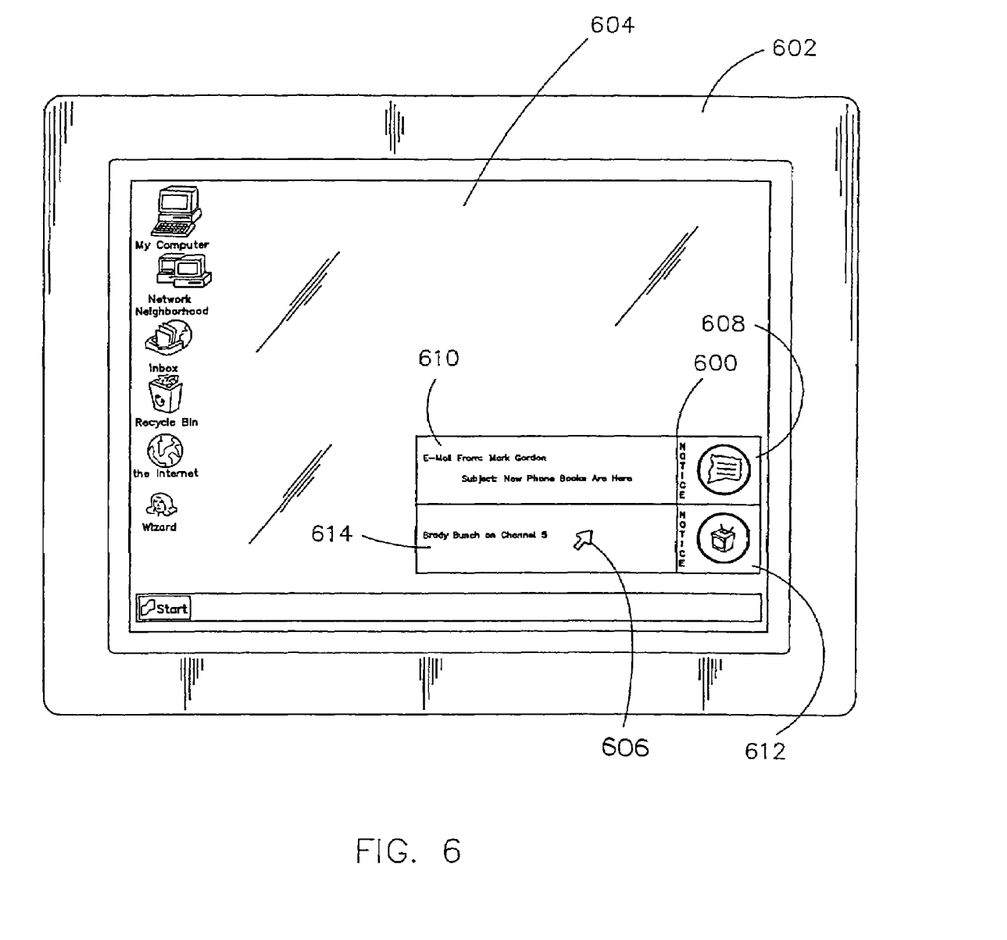
FIG. 6 illustrates the integrated user interface depicted in FIG. 4 as it appears on the user's desktop in a normal operating system environment.

Turning now to FIG. 6, a single integrated user interface (UI) 600 is shown displayed on a display 602 of the convergence system. The single integrated user interface 600 of the present invention may be displayed on or over a standard operating system graphical user interface (GUI) 604 such as a Windows® or Windows® 95 desktop, for example. A user may activate a message by selecting the icon or banner areas 608, 612, 610 & 614 causing the message dispatch engine to send the message to the message sink (see FIG. 2). Preferably, selection of the icon or banner areas 608, 612, 610 & 614 may be accomplished by positioning a mouse cursor 604 over the areas utilizing a mouse (see FIGS. 1 and 2) and depressing or clicking a button on the mouse one or more times. Alternatively, other pointing devices may be used (see FIGS. 1 and 2). Alternatively, selection of the icon or banner areas 608, 612, 610 & 614 may be accomplished utilizing other types of pointing devices (see FIGS. 1 and 2). For example, if a touch screen is utilized, a user may activate a message by touching the touch screen within the areas overlaying the icon or banner areas 608, 612, 610 & 614.

As shown in FIG. 6, a user may, for example, select the television program reminder notice icon 612 or the "Brady Bunch on Channel 5" banner area 614, to start a television application, if necessary, and set the channel to the channel airing the program requested. Similarly, the user may, by selecting the e-mail reminder notice icon 608 or the banner area of the e-mail notification 610, cause an e-mail application to execute and display a received e-mail message to the user. The convergence events notification system is preferably extensible to include events from applications which may later be added to the convergence system. For example, an application providing a "friend finder service" for the Internet may be loaded onto the convergence system. A notification may be generated and displayed to inform the user of other persons with similar interests or who would like to interact with the user via the Internet. If the user selects the notification, an appropriate Internet ready application (games, chat programs Internet phone, etc.) may be started and automatically connected to the other person. Event notifications may in this manner be provided for substantially all events occurring in the convergence system.

Although the invention has been described with a certain degree of particularity, it should be recognized that elements thereof may be altered by persons skilled in the art without departing from the spirit and scope of the invention. Embodiments of the present invention may be implemented as sets of instructions resident in the main memory 104 of the one or more computer systems configured generally as described in FIG. 1. Until required by the computer system, the set of instructions may be stored in another computer readable medium or memory, for example in a hard disk drive, or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions may be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, chemically, physically, optically, or holographically so that the medium carries computer readable information.

It is believed that the convergence events notifications system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A convergence system, comprising:
   an information handling system for providing a notification to a user of selected events occurring within the information handling system, the information handling system comprising:
   a display for displaying a user interface, the user interface capable of displaying a notification representing at least one event occurring in the system;
   an auxiliary memory containing software that includes at least one message source for detecting an event occurring in an application and generating a message containing selected information about the event; a message dispatch engine for filtering, queuing, and dispatching the at least one message and generating a notification of the event to a user, the message dispatch engine adapted to accept an action by the user through the user interface; and at least one message sink for receiving the message from the message dispatch engine and communicating the action to the application whereupon the application executes the action;
   a main memory for executing the software loaded from the auxiliary memory; and
   a processor for running the software and generating the user interface for the display,
   wherein the information handling system is capable of integrating multiple information and entertainment media.

2. The convergence system of claim 1, further comprising at least one peripheral device controlled by the information handling system.

3. The convergence system of claim 2, wherein the at least one peripheral device includes an interactive entertainment apparatus.

4. The convergence system of claim 3, wherein the at least one peripheral device includes a compact disk player.

5. The convergence system of claim 4, wherein the at least one peripheral device includes a digital versatile disk device.

6. The convergence system of claim 1, wherein the multiple information and entertainment media includes television, telephony, Internet, e-mail, and interactive gaming in a single platform.

7. The convergence system of claim 1, wherein the at least one message source comprises at least one dynamic-link library file.

8. The convergence system of claim 1, wherein when a message source of the at least one message source detects an event, that message source routes a message to the message dispatch engine.

9. The convergence system of claim 1, wherein a structure of each message source of the at least one message source is determined by an application generating an events.

10. The convergence system of claim 9, wherein the at least one message source includes multiple message sources, a portion of the multiple message sources are application programming interfaces (APIs).

11. The convergence system of claim 8, wherein, upon receipt of the message, the message dispatch engine generates a notification.

12. The convergence system of claim 11, wherein the notification includes an on-screen representation of the message.

13. The convergence system of claim 12, wherein the on-screen representation of the message includes an icon area.

14. The convergence system of claim 13, wherein the on-screen representation of the message also includes a banner area that is displayed when the user moves a cursor into the icon area.

15. The convergence system of claim 1, wherein the user interface includes an event selection screen that allows the user to select events from a list of all events capable of being monitored by the convergence system.

16. The convergence system of claim 15, wherein the user interface permits the user to prioritize the selected events.

17. The convergence system of claim 15, the user interface includes a default list of events with their corresponding priority.

18. The convergence system of claim 1, further comprising an input output system that provides information to the processor.

19. The convergence system of claim 18, further comprising a compact disk read only memory (CD-ROM) player coupled to the information handling system through the input output system.

20. The convergence system of claim 19, further comprising a digital versatile disk (DVD) player coupled to the information handling system through the input output system.

21. The convergence system of claim 20, further comprising an interactive entertainment apparatus coupled to the information handling system through the input output system.

22. The convergence system of claim 21, further comprising audio equipment coupled to the information handling system through the input output system.

23. A method for notifying a user of events in a convergence system that includes an information handling system, comprising:
   monitoring the convergence system for events;
   generating a message upon the occurrence of an event, wherein the message includes selected information relating to the event;
   notifying the user of the event via a notification displayed by a user interface, wherein the notification is generated using the selected information included in the message, wherein the information handling system is capable of integrating multiple information and entertainment media.

24. The method of claim 23, further comprising queuing the message.

25. The method of claim 23, wherein notifying comprises displaying an icon within the user interface.

26. The method of claim 25, wherein notifying further comprises displaying banner containing information provided by the message, the banner being selectively displayed with the user interface.

27. The method of claim 23, further comprising accepting an action by the user.

28. The method of claim 27, wherein accepting comprises selecting the notification.

29. The method of claim 27, further comprising communicating the action to an application wherein the application executes the action.

30. The method of claim 27, further comprising removing the notification from the user interface.

* * * * *